United States Patent Office 3,244,529
Patented Apr. 5, 1966

3,244,529
PROCESS FOR PRODUCING FREEZE DRIED COFFEE OF IMPROVED COLOR
Joe W. Johnson, 1 Cherry Lane, Basking Ridge, N.J., and George B. Ponzoni, 45 Columbia Ave., and William P. Clinton, 27 Locust Drive, both of Morris Plains, N.J.
No Drawing. Filed Aug. 30, 1963, Ser. No. 305,836
4 Claims. (Cl. 99—71)

This invention relates to a process for producing a dark colored freze dried coffee which resembles the color of roasted and ground coffee.

In the freeze drying of coffee extract it is possible to retain a higher level of aromatics than in other drying methods. This is possible since the non-eutectic water present in the extract in the form of water ice is sublimed directly from the non-eutectic phase. However, freeze drying of coffee extract requires that the non-eutectic water in the extract first be frozen into a solid ice crystal state and then sublimed. In freezing the extract it has been found that coffee which has been rapidly frozen from its ice point (where non-eutectic water crystallizes out of solution) to below its eutectic point (where eutectic water begins to freeze) and then sublimed dries to a light brown or tan color which is undesirable from an appearance standpoint. In order to avoid this light colored coffee product, coffee extract has been slowly frozen from its ice point to below its eutectic point at milder freezing temperatures which develop a larger growth of dendritic crystals of non-eutectic water ice. The gradual formation of this ice crystal structure serves to concentrate remaining unfrozen extract and develop a thicker web or cellular structure of progressively concentrated coffee extract which is ultimately present in a substantially eutectic state at the completion of the freezing step. This concentrated extract will retain its shape and cellular structure upon subsequent subliming of the ice crystals to give a porous structure which is ideally suited for subsequent drying due to the high number of channels available for the removal of water in a vaporous state. However, this method of freezing coffee extract requires freezing times which range from 30 minutes to over 100 minutes in order to develop a desired degree of dark color in the final product.

It would be desirable if a method were devised which could achieve a dark colored freeze dried coffee without the need for slowly freezing the extract prior to freeze drying.

This invention is founded on the discovery that a dark colored freeze dried coffee resembling the color of roasted and ground coffee which comprises cooling a body of coffee extract containing coffee solids and aromatics from its ice point to below the eutectic point of said extract, subliming the water in said extract to initiate development of a porous structure amenable to the removal of water vapor, liquefying a minor portion of said frozen extract at the surface portions of said porous structure, while leaving the balance of said extract in a frozen state, refreezing said liquefied portion of extract, and continuing said sublimation to thereby dry the coffee extract to a porous state and a dark coffee-like color.

More specifically, the above objects are accomplished by subliming the water ice from coffee extract at a temperature which is below the eutectic point (—15° F.) of the coffee extract, say about —16° F., and under a vacuum of less than 500 microns, and periodically fluctuating the temperature and pressure during freeze drying to achieve partial melting of eutectic solution thereby allowing less than 3%, preferably less than 1%, by weight of water ice to be liquefied and distributed throughout the extract. By this method of controlled melt-back the porous cellular structure in the extract is not seriously disturbed to an extent which will effect efficient drying operations. The non-eutectic water may still be sublimed at a rapid rate and the eutectic water may also be evaporated at a rapid rate without serious aroma loss.

As an alternative to the above procedure,, coffee extract may be frozen, a substantial proportion of the water ice dehydrated by sublimation from said extract to achieve a total terminal moisture of 12–20% and a water ice content of 0.1–8%, and then subjecting the partially dried extract to controlled melt-back prior to refreezing and drying thereby achieving a darker colored coffee product.

In accomplishing the purpose of this invention according to the latter technique, it is preferable to partially dry the coffee extract to a point where only a small amount of non-eutectic water is present as water ice. While this range may be as high as 8%, it is preferable to dry the extract to a range wherein the water ice is present at a level of only 0.1 to 3%.

Limiting the amount of water ice available is important in controlling the degree of melt-back in order to achieve a darkened coffee extract. Excessive melt-back will destroy the cellular structure produced by removal of the discrete ice crystals dispersed throughout the body of coffee extract. Excessive wetting of the dried extract will disturb or destroy the porous nature of the dried extract and render the extract impossible to dry either by evaporation or sublimation in a reasonable length of time at low product temperatures that will not destroy the quality of the finished product. Porosity is essential for drying by sublimation or evaporation, and when melt-back is not controlled, the loss of void spaces within the dried extract through which water vapor may pass renders the product incapable of drying without undergoing product and aroma degradation.

Controlled melt-back, according to this invention, may be accomplished by drying frozen extract by sublimation at temperatures of below —15° F. and under a vacuum of less than 500 microns until a terminal moisture content of 12–20% is achieved, preferably 12–15%. At this point the surface of the partially dried extract will be superficially dry to the touch while the interior portions of the extract still retain a small portion of non-eutectic water present in the form of water ice. This will be true whether a large body of coffee extract is being dried in the form of a large slab of varying thickness or in the form of pellets, particles or chips. In either case the extract will dry from the exterior inwardly and the interior portions will dry last.

By the process of this invention advantage is taken of the non-eutectic water which is still present in the form of ice within the interior portions of the extract being dried by liquefying and equilibrating at least a portion of the ice throughout the body of coffee extract. Visually, this may be observed by a darkening of the surface of the extract thereby indicating an equilibration of liquified ice throughout the body of extract. Melt-back must not be continued to a point wherein the dried portion of extract loses its shape or form by excessive wetting since this will destroy the porous of cellular nature of the dried extract and render the extract incapable of drying. This can be readily avoided by drying the extract to a terminal moisture content wherein very little non-eutectic water is present for the darkening step. Levels of about 0.1 to 3%, say 1.5% of non-eutectic water may usually be distributed without danger of losing the cellular structure.

The water ice may be distributed in a liquefied state throughout the surface portions of dried material by either elevating the temperature or the pressure within the freeze-drying chamber or preferably by elevating both temperature and pressure to a point wherein the surface of the frozen eutectic solution (composed of eutectic water, coffee solids and coffee aromatics) is caused to melt and wet the dried coffee solids. After the material is darkened, preferably by distributing 0.1 to 3% of non-eutectic water throughout the material, the melted portion is refrozen and dried by sublimation in a vacuum of less than 500 microns. After the non-eutectic water is removed, the remaining water which is present as eutectic solution may be removed at drying temperatures above the eutectic point and as high as 80–120° F. at the termination of the drying cycle, the product temperature being raised at a uniform rate of 8–12 degrees, say 10 degrees, for each one percent of eutectic water removed. This eutectic water may be redistributed into non-eutectic water by melting the eutectic and in this case the eutectic point itself will be increased dependent upon the amount of eutectic water which is removed.

This invention will be described by reference to the following specific examples.

*Example 1*

About 28,000 cc. of commercial coffee extract containing 8850 grams of soluble coffee solids (27% concentration) was poured into seven polyethylene pouches having dimensions of 20″ x 24″. The pouches were placed in freezing molds having a thickness of 7/16 inch, the molds being immersed in Dry Ice having a temperature of −109° F. About 3 minutes was allowed for the extract to freeze. The pouches were removed from the freezing molds and the frozen extract which had a light tan color was removed from the pouches and transferred to meshed stainless steel drying trays. The drying trays were then placed in a commercial freeze dryer and the coffee was dried under a vacuum of less than 500 microns, a condenser temperature of between −40° and −70° F. and a platen temperature which was controlled to provide sublimation of non-eutectic water in said extract at a product temperature of below −15° F. The non-eutectic water was sublimed for a period of about 3 hours in which time a terminal moisture content of 12–14% was achieved, the terminal moisture being measured by weight differential in the extract as it dried. The freeze drying chamber was then opened to atmosphere. The frozen extract at this point still retained its light tan color and was superficially dry to the touch. The extract was exposed to atmospheric conditions for about 12 minutes when the surface of the extract appeared to become moistened and visually darkened. The extract at this point still retained its shape and form and its porous cellular structure did not appear to be disturbed. No excessive wetting or dripping of water from the extract was noted. The chamber was then immediately closed to atmosphere and the darkened extract was again subjected to a vacuum of less than 500 microns and a platen temperature which assured sublimation of water ice at a temperature of below −15° F. for two additional hours until the terminal moisture was reduced to 10%. The vacuum was then increased to between 50–150 microns while the platen temperature in the freeze drying chamber was elevated gradually at the rate of 10 degrees for each one percent of eutectic water removed until the extract had a terminal moisture content of 2% and a product temperature of 80° F. About 10 hours further drying time was required to reduce the terminal moisture content to this level. The final freeze dried product was uniformly dark in appearance and resembled the color of roasted and ground coffee.

*Example 2*

The procedure of Example 1 was followed with the exception that the freeze drying chamber was not exposed to atmosphere after the product reached a terminal moisture content of 12–14% but the condenser temperature was elevated from below −40° F. to about −20° F. and the pressure was elevated to between 2000 and 3000 microns. The remaining non-eutectic water in the interior portions of the extract which was in the form of water ice was allowed to liquify and equilibrate to the surface of the extract thereby darkening the color of the dried extract. This required a holding time of about two hours until the product was darkened to a suitable extent. The procedure of Example 1 was then followed to obtain a product similar to that of Example 1.

*Example 3*

The procedure of Example 1 was followed with the exception that the frozen coffee extract was ground in a Fitzpatrick mill to a particle size distribution of between 10–90 mesh U.S. Standard Sieve. The particles were then dried to a terminal moisture of 12–14% and exposed to atmosphere for about 3 minutes at which time the particles began to visually become darkened. The particles were then refrozen and dried according to the procedure of Example 1 to produce a granular freeze dried coffee which was uniformly dark brown in color and resembled very closely the color and appearance of freshly roasted and ground coffee.

*Example 4*

The procedure of Example 1 was followed with the exception that when the product was reduced to a terminal moisture of 12–14%, the freeze-drying chamber was not opened to atmosphere. Instead, the product temperature was raised to 0° F. for one minute, then lowered to −20° F. in less than 3 minutes. This was repeated three successive times to achieve a very dark and coffee-like color in the product. The procedure of Example 1 was then followed to complete the drying. The dried product of this example was darker than the product of Example 1.

While this invention has been described by reference to specific examples, it is intended to be limited only by the scope of the appended claims.

What is claimed is:

1. A process for improving the color of frozen coffee extract during freeze-drying which comprises freezing said coffee to below its eutectic point at a rate sufficiently rapid to lighten the color of said extract during freezing, subliming water from said frozen extract until a dry shell of porous coffee solids is attained at the surface of said frozen extract, thawing the frozen coffee to melt between 0.1 and 8% of the water present in said extract, distributing said melted water throughout the dried shell of coffee solids to thereby darken the color of the coffee, and resuming sublimation of water from said extract until said coffee solids have been reduced to a stable moisture content.

2. A process for improving the color of frozen coffee extract during freeze-drying which comprises freezing said coffee to below its eutectic point at a rate sufficiently rapid to lighten the color of said extract during freezing, subliming water from said frozen extract until a dry shell of porous coffee solids is attached at the surface of said extract, thawing said frozen coffee to melt between 0.1% and 3% of the water contained in said extract, equilibrating said water throughout the dry shell of coffee solids to thereby darken the color of said shell, refreezing said extract to below its eutectic point and resuming sublimation of the water in said extract until the coffee solids have been reduced to a stable moisture content.

3. The procedure of claim 2 wherein the thawing and equilibrating steps are repeated several times until the desired degree of dark color is attained.

4. A process for improving the color of frozen coffee extract during freeze-drying which comprises cooling said coffee to below its eutectic point at a rate sufficiently rapid to lighten the color of said extract, subliming water from said extract until the average moisture content of said extract is reduced to between 12% and 20% moisture and a dry shell of porous coffee solids is formed, thawing the frozen coffee to melt 0.1% to 3% of the water contained in said extract, equilibrating this moisture throughout the dry coffee solids to thereby darken the color of said solids, refreezing the equilibrating water and continuing sublimination of the water from said extract until the coffee solids have been reduced to a stable moisture content.

References Cited by the Examiner
UNITED STATES PATENTS

| | | | |
|---|---|---|---|
| 2,751,687 | 6/1956 | Colton | 99—71 |
| 2,994,132 | 8/1961 | Neumann | 34—5 |

A. LOUIS MONACELL, *Primary Examiner.*

M. W. GREENSTEIN, *Assistant Examiner.*